(12) United States Patent
Savaresi et al.

(10) Patent No.: US 8,958,975 B2
(45) Date of Patent: Feb. 17, 2015

(54) MOTOR-VEHICLE DRIVING STYLE ESTIMATING SYSTEM AND METHOD

(75) Inventors: Sergio Matteo Savaresi, Cremona (IT); Vincenzo Manzoni, San Pellegrino Terme (IT); Andrea Corti, Drezzo (IT)

(73) Assignee: Teleparking S.R.L., Milan (IT)

( * ) Notice: Subject to any disclaimer, the term of this patent is extended or adjusted under 35 U.S.C. 154(b) by 228 days.

(21) Appl. No.: 13/579,873

(22) PCT Filed: Dec. 20, 2010

(86) PCT No.: PCT/IB2010/055933
§ 371 (c)(1),
(2), (4) Date: Aug. 17, 2012

(87) PCT Pub. No.: WO2011/101713
PCT Pub. Date: Aug. 25, 2011

(65) Prior Publication Data
US 2012/0316767 A1    Dec. 13, 2012

(30) Foreign Application Priority Data
Feb. 19, 2010 (IT) ................. MI2010A0261

(51) Int. Cl.
*G06F 7/00* (2006.01)
*B60W 40/00* (2006.01)
(Continued)

(52) U.S. Cl.
CPC ............ *B60W 40/09* (2013.01); *B60T 2220/02* (2013.01); *B60W 2050/0056* (2013.01); *B60W 2520/10* (2013.01); *B60W 2520/105* (2013.01); *G07C 5/085* (2013.01)
USPC ................. 701/123; 701/1; 701/29.1; 701/44

(58) Field of Classification Search
CPC ............ B60W 50/14; B60W 2520/10; B60W 2520/105; B60W 40/09; B60W 40/10; B60W 50/0097; B60R 16/0232; B60K 2350/962
See application file for complete search history.

(56) References Cited

U.S. PATENT DOCUMENTS

2004/0236473 A1* 11/2004 Dorey et al. ................ 701/1
2007/0145819 A1   6/2007 Lin et al.
(Continued)

FOREIGN PATENT DOCUMENTS

EP    1 834 816 A1   9/2007
EP    1 900 589 A2   3/2008
(Continued)

OTHER PUBLICATIONS

International Search Report for PCT/IB2010/055933, dated May 31, 2011.
(Continued)

*Primary Examiner* — James Trammell
*Assistant Examiner* — Demetra Smith-Stewart
(74) *Attorney, Agent, or Firm* — Sughrue Mion, PLLC (57) ABSTRACT

A motor-vehicle driving style estimating system (100) of a motor-vehicle, comprising a measuring apparatus (1) of a kinematic signal representative of a motor-vehicle motion quantity trend (v(t)). The system is characterized in that it further comprises a kinematic signal low-pass filtering module (8) configured to provide a corresponding reference filtered signal associated with a reference trend of said quantity ($v_F(t)$). Furthermore, the system comprises a kinematic signal and reference filtered signal processing module (2) configured to provide an indication of the driving style depending on a comparison of the motor-vehicle motion trend with the reference trend.

12 Claims, 8 Drawing Sheets

(51) Int. Cl.
*B60W 40/09* (2012.01)
*B60W 50/00* (2006.01)
*G07C 5/08* (2006.01)

(56) References Cited

U.S. PATENT DOCUMENTS

| | | |
|---|---|---|
| 2010/0023196 A1 | 1/2010 | Huang et al. |
| 2010/0023296 A1* | 1/2010 | Huang et al. ............... 702/141 |
| 2010/0055649 A1* | 3/2010 | Takahashi et al. ............ 434/66 |
| 2010/0057335 A1* | 3/2010 | Urhahne ..................... 701/123 |
| 2010/0211270 A1* | 8/2010 | Chin et al. ..................... 701/44 |

FOREIGN PATENT DOCUMENTS

| | | |
|---|---|---|
| EP | 1 990 259 A1 | 11/2008 |
| WO | 00/07150 A1 | 2/2000 |

OTHER PUBLICATIONS

Italian Search Report for IT MI2010A000261, dated Nov. 30, 2010.

* cited by examiner

MOTOR-VEHICLE DRIVING STYLE ESTIMATING SYSTEM AND METHOD

CROSS REFERENCE TO RELATED APPLICATIONS

This application is a National Stage of International Application No. PCT/IB2010/055933 filed on Dec. 20, 2010, which claims priority from Italian Patent Application No. MI2010A00261, filed on Feb. 19, 2010, the contents of all of which are incorporated herein by reference in their entirety.

TECHNICAL FIELD OF THE INVENTION

The present invention relates to the driving style estimating techniques adopted by a driver of a motor-vehicle.

KNOWN ART

Several driving style estimating techniques are known of drivers of motor-vehicles, to be implemented with reference to the estimation of fuel consumption, the safety of behaviour of the driver or in order to generally evaluate his driving capabilities. According to some techniques, the estimation is also made in order to proceed with an automatic control of some driving aspects of the motor-vehicle.

Patent application EP-A-1780090 describes a method for defining the driving style of a driver of a motor-vehicle, which provides the monitoring of various characteristics among which: the number of horn actuations, the speed variation, the variation of the pedal position, the angular velocity determined by the movements of the steering wheel. The estimation is then based on the calculation of differences between these monitored characteristics and predetermined threshold values.

Patent application EP-A-0777071 describes a control method of the automatic transmission of a vehicle in function of the driving style of the driver based, inter alia, on following information: aperture of the fuel valve, vehicle speed, angular velocity of the engine.

Patent application EP-A-1498297 describes an estimating method of the fuel consumption which serves for monitoring numerous characteristics among which are: a signal of rotation velocity of the driving wheel, a signal of rotation velocity of the engine axis, a signal of cooling temperature, a signal of fuel temperature.

BRIEF SUMMARY OF THE INVENTION

The Applicant has observed that the traditional techniques for estimating the driving style are too much complexes and onerous from a computing viewpoint, and adopt classification criteria of the style of the driver based on predefined standards which often appear unrealistic.

The aim of the present invention is to propose motor-vehicle driving style estimating techniques, combining not too great a complexity still leading to a definition of the guide style which results sufficiently realistic and reliable.

The aim of the present invention is reached by a driving style estimating system as defined according to claim 1. Preferred embodiments are defined by the dependent claims 2 to 11. Subject of the invention is also a driving style estimating method as defined in claim 12.

BRIEF DESCRIPTION OF THE DRAWINGS

Further characteristics and the advantages of the invention result from the following description of a preferred embodiment and of its variations, given in an exemplary way with reference to the annexed drawings, in which.

DESCRIPTION OF EMBODIMENTS OF THE INVENTION

Figure 1:
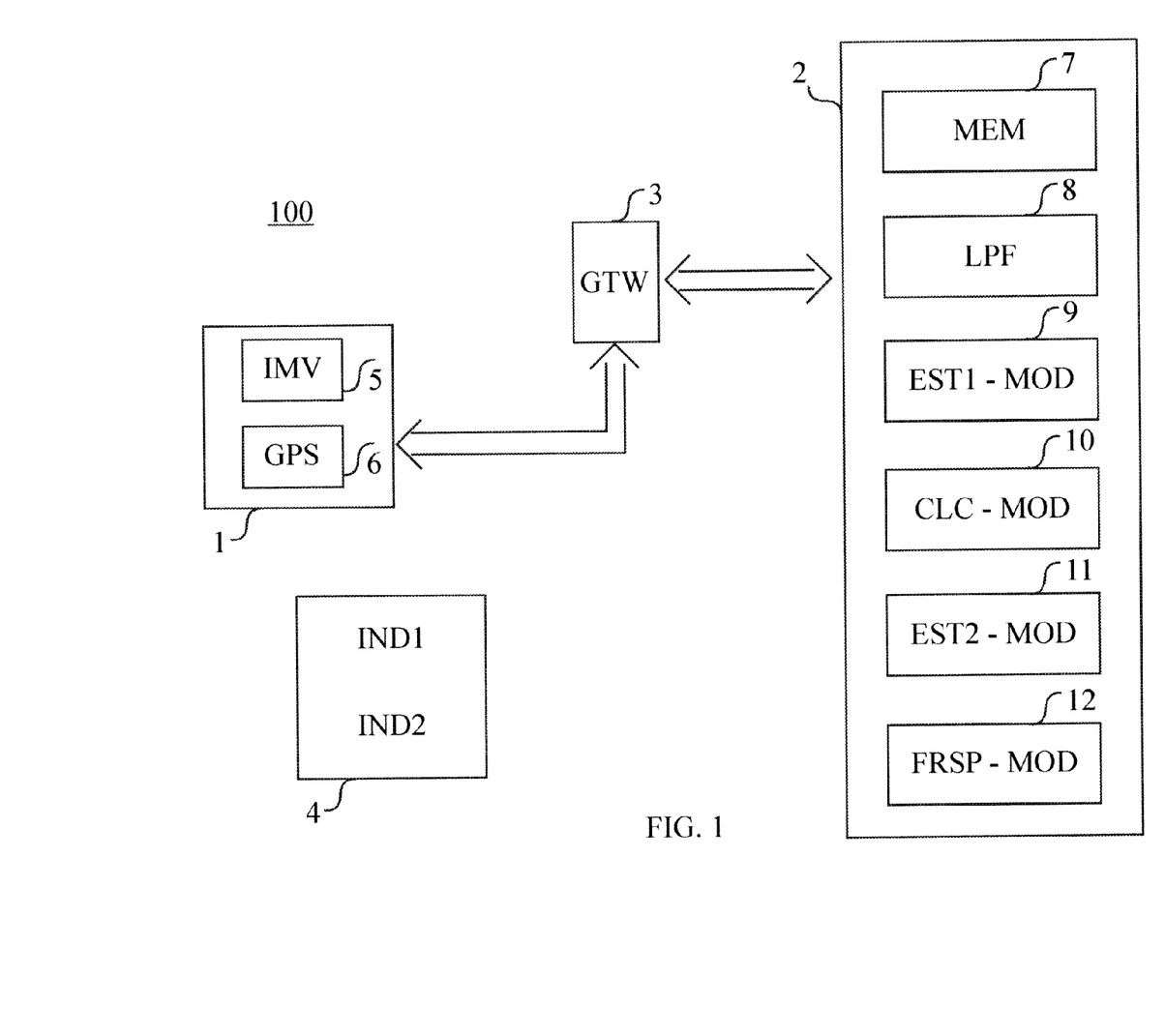
FIG. 1 schematically shows an example of a driving style estimating system of the driver of a motor-vehicle.

FIG. 1 shows an example of a driving style estimating system 100 of the driver of a motor-vehicle. In particular, the estimating system 100 comprises a measuring apparatus 1 and a computer system 2 able to communicate, for example, through a gateway device 3 (GTW). For example, the estimating system 100 is also provided with a presentation or reporting device 4 of the results of the estimation performed.

The measuring apparatus 1 is preferably mounted on the motor-vehicle and permits to supply electric signals, particularly digital signals, representative of kinematic characteristics associated to the movement of the vehicle itself. The digital signals emitted by the measuring apparatus 1 can be a speed signal of the motor-vehicle and, for example, also an acceleration signal of the motor-vehicle itself. Alternatively, the measuring apparatus 1 can supply electric signal in analogue form which can be converted in digital ones in order to permit, for example, numerical elaborations made through software. The digital conversion can be made for example also by the gateway device 3.

According to a specific embodiment, the measuring apparatus 1 can comprise a speed transducer and an acceleration transducer of the motor-vehicle. To this end, the acquisition apparatus of the signals 1 is for example provided with an inertial measuring system 5 (IMU), known by itself (known in the field with the name of "inertial platform"), which comprises a computer and movement sensors able to supply the speed signal and the acceleration signal of the motor-vehicle (in direction, sense and amplitude) and, optionally, even other signals describing the movement of the motor-vehicle.

Furthermore, the measuring apparatus 1 can be advantageously also provided with a positioning device 6 (GPS) as a receiver acting in a satellite positioning system like, for example, the GPS system (Global Positioning System). The receiver GPS6 is able to supply in addition to the position of the motor-vehicle also a corresponding speed signal.

With reference to the computing apparatus 2 this is, according to an embodiment, a data elaboration unit or a computer (provided with memories, processing units and interfaces with the outside) able to receive the signals coming from the measuring apparatus 1 and to perform computing and elaboration operations in order to estimate the driving style of the motor-vehicle adopted by a particular driver.

In particular, the data processing unit 2 also comprises a memory of the measured data 7 (MEM) and a plurality of modules, preferably of the software type and a low-pass filtering module 8 (LPF), a first estimating module 9 (EST1-MOD) ad a calculation module 10 (CLC-MOD). As it will be further explained, the first estimating module 9 is able to estimate the driving style based on the energy used or consumed by the motor-vehicle. According to another embodiment, the data processing unit 1 is also provided with a second estimating module 11 (EST2-MOD) so configured to perform an estimation of the guide style based on the safety for the passengers of the motor-vehicle.

The data processing unit 2 can be mounted on board of the motor-vehicle or can be remote from this and reside, for example, in a monitoring station. When mounted on the motor-vehicle, the data processing unit 2 can be connected with the measuring apparatus 1 through cables or through the gateway device 3, which guarantees a radio-frequency short-range connection (as, for example, a connection based on the Bluetooth protocol) with the data processing unit 2 and with the inertial measuring system 5 and the receiver GPS 6.

Advantageously, the data processing unit 2 can be provided with a cellular transceiver device able to communicate by means of a mobile telephone system with a monitoring station. Alternatively, if the data processing unit 2 is placed in the monitoring station, such cellular transceiver device permits to communicate with a suitable further cellular transceiver device placed on board of the motor-vehicle. Advantageously, the processing device 2 can be a smartphone.

Figure 2:
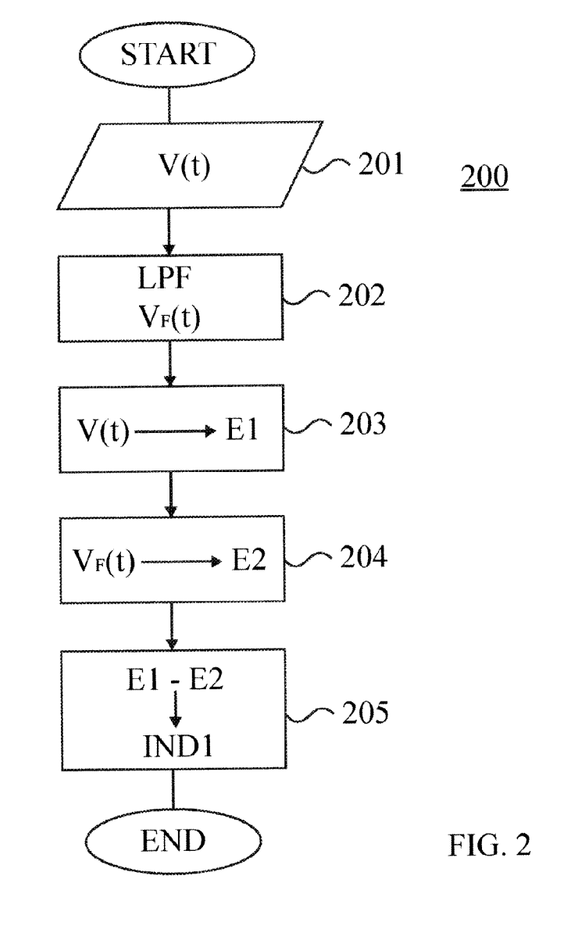
FIG. 2 shows a flow chart referring to a motor-vehicle driving style estimation method, which can be implemented by means of the estimating method described with reference to FIG. 1.

The reporting device 4 can preferably reside on board of the motor-vehicle and in this case it advantageously coincides with the processing unit 2. The reporting device 4 can also reside in the monitoring station or it can reside on the motor-vehicle and be a device separated from the processing device 2. In any case, the reporting device 4 preferably comprises one display able to visualize information permitting to the driver to know the result of the estimation of its own driving style. FIG. 2 shows a flow-chart 200 referring to a driving style estimating method of the motor-vehicle, which can be for example implemented by means of the estimating system described with reference to FIG. 1.

After a symbolic starting phase, the method provides a measuring phase 201, in which the inertial measuring system 5 supplies a digital electric signal representative of the development of a kinematic characteristics associated to the movement of the motor-vehicle, like for example the amplitude of the speed v(t) assumed by the motor-vehicle along a measurement path. The speed signal v(t) can also alternately be supplied by the GPS receiver 6. A possible definition criterion and automatic calculation of the duration of the measurement path considered for the estimation, will be described hereinafter.

The speed digital electric signal v(t) is made available to the data processing unit 2, by means of the gateway device 3.

Figure 3:
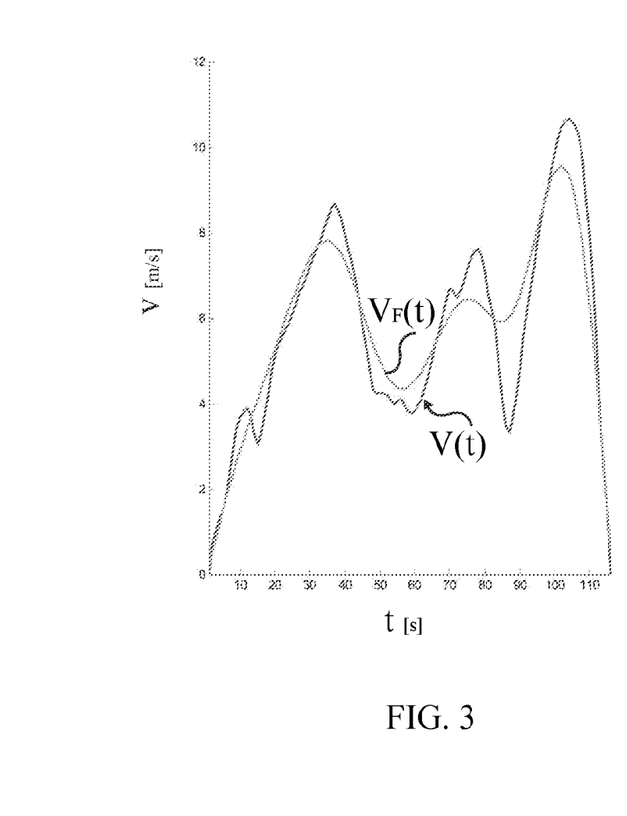
FIG. 3 shows a curve relating to a measured speed signal and a curve relating to a signal obtained through low-pass filtering of said measured speed signal.

FIG. 3 shows a curve v(t) corresponding to a specific development of the speed, experimentally measured. The curve v(t) of FIG. 3 has lengths corresponding to sudden speed variations. The digital values corresponding to the speed signal v(t) are stored in memory 7.

In a filtering phase 202, the processing unit 2 processes the digital values associated to the speed signal v(t) by performing a digital filtering of the low-pass type and so giving a filtered digital signal.

The filtered digital signal corresponds to a filtered speed $v_F(t)$, shown as an example in FIG. 3 and indicative of a reference development for the speed. The curve of the filtered speed $v_F(t)$ in FIG. 3 does not have the sudden variations instead present in the curve v(t). It is assumed that the filtering phase eliminates from the speed signal those speed sudden variations caused by an unwise way of driving, and that therefore permits to obtain a significant reference signal. For example, these sudden variations could be due to the fact that the driver has not promptly perceived that the traffic light is yellow and suddenly decelerates.

With reference to the low-pass filtering, it can be realized by the filtering module 8 of FIG. 1 by means of known digital filtering techniques employing for example a FIR (Finite Impulse Response) filter, or preferably, an IIR (Infinite Impulse Response) filter, for example, of the Butterworth type and of a suitable order. Alternatively, it is also possible to make a filtering on the speed signal in analogue form, if available, by means of an analogue low-pass filter.

With reference to the particular case of the estimation of the driving style of bus drivers, it has been experimentally noticed that the preferred values for a cutting frequency $f_c$ associated to the low-pass filtering are for example comprised between 0.04 Hz and 0.06 Hz, in the case of an IIR filter of the Butterworth type of the second order. A particularly preferred value of the cutting frequence $f_c$ equal to 0.05 Hz has been experimentally obtained by analyzing the behaviour of several bus drivers, for the same distance and considering a Butterworth filter of the second order. The particular value of 0.05 Hz has been obtained by observing the frequence spectrum of all park test and by choosing the value reached by the most virtuous driver.

On the base of a comparison between the speed signal v(t) and the filtered signal $v_F(t)$ it is possible to give an indication of the driving style of the motor-vehicle. In particular, this comparison and the related indication of the driving style are based on a calculation of the energy used by the motor-vehicle in the measurement path.

In a greater detail, in a first calculation phase 203 a calculation is made of an estimation of the energy $E1(t)$ used by the motor-vehicle in the measurement path, by using the speed signal v(t) (preferably, in a digital form) and a mathematical model of the motor-vehicle. The calculation of the energy E1 can be made by the calculation module 10 of FIG. 1. With reference to the mathematical model to use, let us assume that the longitudinal force $F_{engine}$ supplied by the engine of the motor-vehicle could be for example expressed as:

$$F_{engine}(t) = Ma(t) + \tfrac{1}{2}\rho S C_x v(t)^2 \quad (1)$$

in which:
M is the mass of the motor-vehicle;
a(t) is the longitudinal acceleration of the motor-vehicle;
ρ is the air density which depends on the pressure, altitude and temperature conditions;
S is the front surface of the motor-vehicle;
$C_x$ is the drag coefficient descriptive of the shape of the motor-vehicle;
the term M a(t) represents the inertial force of the motor-vehicle;
the term $\tfrac{1}{2}\rho S C_x v(t)$ represents the drag force.

In the formula (1), the terms referring to the braking force and to the force associated to the slope of the area covered by the path of the motor-vehicle are not indicated, as they were not considered in the performed tests. Nevertheless, the term referring to the braking force could be advantageously considered in the case of a motor-vehicle with electric motor, for which the energy associated to such term is at least partially recoverable.

The power $P_{engine}$ supplied by the motor is given as:

$$P_{engine}(t) = Ma(t)v(t) + \tfrac{1}{2}\rho S C_x v(t)^2 v(t) \qquad (2)$$

The first term of the formula (2) is the inertial power, whereas the second term is the aerodynamic power. Following tests performed on distances covered by bus, it has been observed that the inertial power is approx. ten times greater than the aerodynamic one, when a rather low cruise speed has been adopted.

The estimated energy $E1(t)$ is given by the time integral of the power, on the measurement range 0–t1:

$$E1(t) = \int_0^{t1} P_{engine}(t)\,dt \qquad (3)$$

In the first calculation phase 203, the calculation module 10, based on the formulae (2) and (3), makes a numeric processing of the available digital data and estimates the energy E1 utilized by the engine of the motor-vehicle. In particular, for the purposes of this calculation in addition to the speed signal v(t) obtained by the measurement an acceleration signal is also used, representative of the acceleration a(t), which can be supplied by the inertial measuring system 5 or can be obtained by an operation of a time derivative of the speed signal v(t), in turn measured by the inertial measuring system 5 or supplied by the GPS receiver 6.

Figure 4:
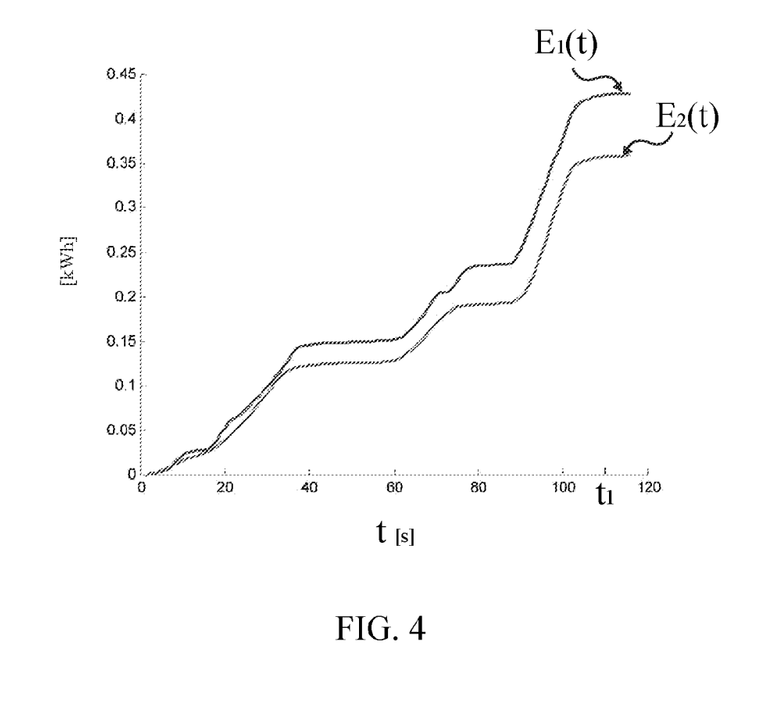
FIG. 4 shows a curve relating to an estimated energy utilized by the motor-vehicle and a curve relating to a reference energy.

FIG. 4 shows an example of the time course of the estimated energy $E1(t)$ associated to the course of the measured energy v(t). According to this example, to the estimated energy $E1(t)$ a consumption corresponds equal to 0.428 KWh.

In a second calculation step 204 the calculation module 10 makes an estimation of a reference energy $E2(t)$ representing the energy which the engine of the motor-vehicle would have utilized in the case in which the driving of the motor-vehicle would have occurred according to a pattern of reference associated to the filtered speed signal $v_F(t)$. For this calculation the calculation module 10 utilizes, for example, the following formulas:

$$P_{2_{engine}}(t) = Ma_F(t)v_F(t) + \frac{1}{2}\rho S C_x v_F(t)^2 v_F(t) \qquad (4)$$

$$E2(t) = \int_0^{t1} P_{2_{engine}}(t)\,dt \qquad (5)$$

In such formulas (4) and (5), in addition to the still defined parameters the filtered speed signal $v_F(t)$ appears and its derivative $a_F(t)$. FIG. 4 shows an example of the time course of the reference energy $E2(t)$ associated to the reference speed course $v_F(t)$ obtained by the filtering of the measured speed signal v(t). According to this example, to the reference energy $E2(t)$ a consumption of 0.358 KWh corresponds.

In a comparison step 205, the first estimation module 9 compares the value of the energy associated to the measured course with the value of the reference energy and in function of their difference gives an indication referring to the driving style adopted by the driver. This indication can be supplied in different forms. According to an example, the estimation module calculates and makes available a first indication IND1 representing in percentage the difference between the estimated energy E1 consumed in the whole on the measurement path and the reference one E2 for the same path:

$$IND1 = (E1(t1) - E2(t1))/E2(t1)100$$

The processing unit 2 can make available this first indication IND1 to the reporting device 4 in order that it can be visible also for the driver. The method 200 ends with a symbolic END step.

Turning back to the measurement step 201, it should be noted that for the purpose of the precision of the estimation of the utilized energy, it is advantageous to provide a measuring apparatus 1 able to supply a speed signal v(t) having a rich information content, that is having a band at least equal to the characteristic dynamics of the motor-vehicle. It is possible that the inertial measurement system 5 be just provided with an accelerometer for the measurement of the longitudinal acceleration, whereas for the measurement of the speed only the receiver GPS 6 be available.

Still with reference to tests performed on passenger transportation busses, the Applicant has observed that the signal representing the speed supplied by the receiver 6 has an information content of good quality at low frequencies and of a modest quality at high frequencies, that is the spectrum of the speed signal appears to be rich of information content up to approx. 0.05 Hz. Instead, the acceleration signal supplied by an accelerometer of the inertial measuring system 5 appears to be accurate at high frequencies being of lower quality at low frequencies, that is its spectrum is rich of information content above approx. 0.05 Hz. It should be noted that, for example, the accelerometer of the inertial system 5 is typically realized with a MEMS technology (Micro Electro-Mechanical Systems).

Figure 5:
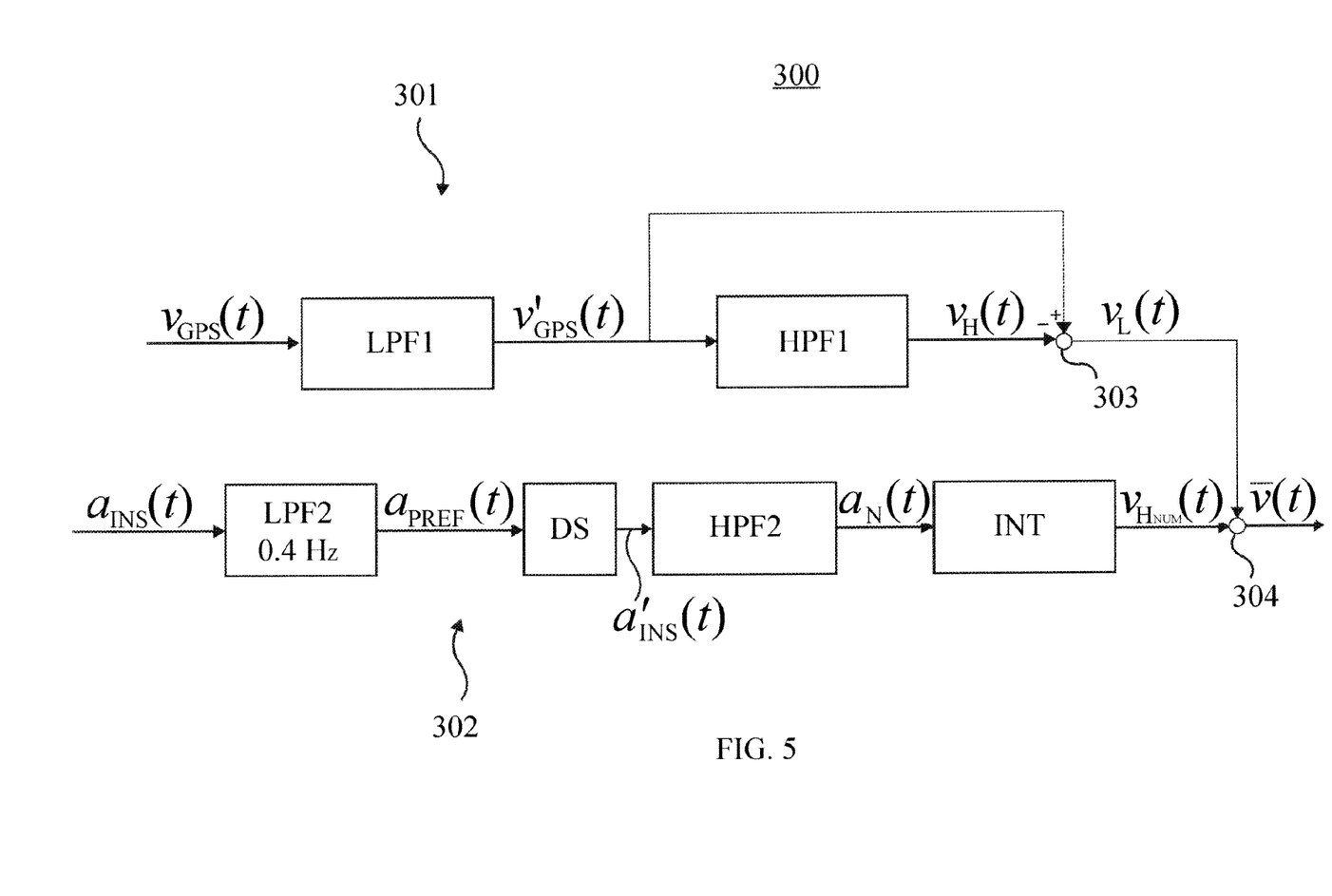
FIG. 5 shows a basic diagram of a pre-treating circuit of speed and acceleration signals according to a particular embodiment.

In this case the method of the frequency separation is applicable in order to build a speed signal which takes into account the information content supplied both by the GPS receiver and the inertial accelerometer. A basic diagram of a pre-treating circuit 300 is shown in FIG. 5 by means of functional blocks. Anyhow, this method can be performed by software for example at the processing unit 2 and by means of an optional frequency separation module 12 (FRSP-MOD).

The pre-treating circuit 300 comprises a first processing branch 301 of the speed signal $v_{GPS}(t)$ supplied by the GPS receiver 6 and a second processing branch 302 of the acceleration signal $a_{INS}(t)$ supplied by the inertial accelerometer 5, a first knot 303 and a second knot 304.

The first branch 301 is provided with an input for the speed signal $v_{GPS}(t)$ supplied by the GPS receiver 5 connected to the first low-pass filter LPF1 able to eliminate the high frequency noise components. The first low-pass filter LPF1 is, for example, an IIR filter of the Butterworth type, of the fourth order having, in particular, a cutting frequency of about 0.4 Hz.

The signal $v'_{GPS}(t)$ coming out of the first low-pass filter LPF1 is supplied to a first high-pass filter HPF1 which removes its high frequencies by returning a high frequency signal $v_H(t)$. The high frequency signal $v_H(t)$ is supplied to a subtracting input of the first knot 303, to which the same signal $v'_{GPS}(t)$ coming out of the first low-pass filter LPF1 is also supplied. At the output of the first knot 303 a low frequency speed signal $v_L(t)$ is present, which is supplied to an adder terminal of the second knot 304.

The second branch 302 is provided with an input terminal for the acceleration signal $a_{INS}(t)$ supplied by the inertial accelerometer 5 and connected with a second low-pass filter LPF2 (for example, the same as the first LPF1 filter) for removing the high frequency noise, which returns a pre-filtered acceleration signal $a_{PREF}(t)$. The pre-filtered acceleration signal $a_{PREF}(t)$ is then de-sampled by a de-sampling block DS in order that it has in its digital form the same sampling frequency of the speed signal $v_{GPS}(t)$.

A de-sampled acceleration signal $a'_{INS}(t)$, coming out of the de-sampling block DS is then supplied to a second high-pass filter HPF2 which returns a high frequency acceleration signal $a_H(t)$. Such high frequency acceleration signal $a_H(t)$ is then integrated by an integrator INT which then supplies a high frequency speed signal $v_{HNUM}(t)$ which is summed from the second knot 304 to the low frequency speed signal $v_L(t)$ so generating the speed signal $\bar{v}(t)$ obtained through the frequency separation technique described before, which can be utilized by the estimation method 200 of FIG. 2.

It must be noted that the low frequency speed signal $v_L(t)$ applied to the second knot 304 could also be obtained through another low-pass filter of the signal $v'_{GPS}(t)$, but the basic diagram shown in FIG. 5 permits to utilize a second high-pass filter HPF2 identical to the first high-pass filter HPF1 and so this choice reduces the complexity of the numerical algorithm which implements the diagram of FIG. 5.

So advantageously, the first and the second high-pass filter HPF1 and HPF2 have the same order and the same cutting frequency which, for example, can be fixed and chosen on the base of experimental tests or it can be determined by choosing the frequency value which minimizes the difference between a first distance d1 covered by the motor-vehicle and determined on the base of the latitude and longitude coordinates given by the GPS receiver 6 and a second distance d2 obtained as a speed integral $v_{GPS}(t)$. A possible value for the cutting frequency of the high-pass filters HPF1 and HPF2 is comprised between 0.06 and 0.08 Hz, preferably it is 0.07 Hz. The first and second high-pass filter HPF1 and HPF2 are realized through a Butterworth filter of the second order.

Regarding the presentation times to the driver or to any other observer of the estimation of the driving style, various criteria can be adopted. For example, it is possible to provide the result of the estimation at the end of a predetermined distance covered by the motor-vehicle or periodically, that is at the expiration of a predetermined period. According to a preferred mode, the result of the estimation is provided at each stop of the motor-vehicle.

It is considered that, on the base of experimental evaluations, the choice of performing the calculations for the estimation of the driving by considering the speed signal acquired between a start and a stop, permits to refer to an average speed of the motor-vehicle which is correct, so making the estimation particularly reliable.

Furthermore, the choice to provide the result to the driver after the stop permits to the same driver a rapid vision of the first indication IND1 representing his own driving style.

An example of a criterion of automatic determination of the start and the stop of the motor-vehicle and so of the determination of a starting time of the acquisition of the speed and acceleration results measured and of a final time, in which the result of the estimation be provided to the driver, will be described in the following.

The automatic determination of a stop made on the base of the speed signal provided by the GPS receiver can have a difficulty due to the fact that the information provided by such receiver have a quality highly dependent on the specific satellite coverage.

Figure 6:
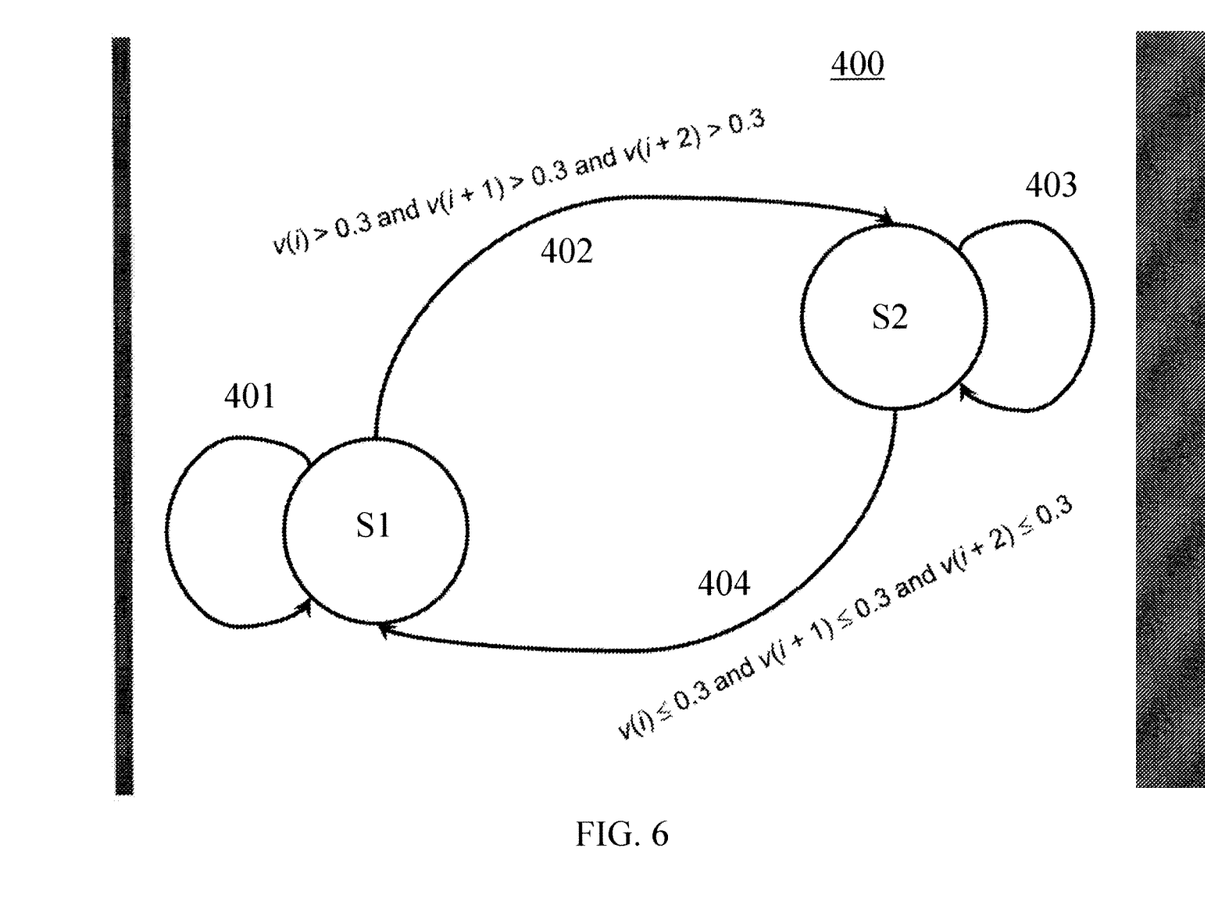
FIG. 6 shows a state diagram referring to an example of an automatic revealing method of stop and start instants of the motor-vehicle.

Reference is made to the state diagram 400 of FIG. 6, which defines a start waiting state S1 and a stop waiting state S2. Such diagram describes an algorithm which can be implemented through a software, in the calculation module 10 of the processing unit 2 or by means of a state machine realized through a logic. According to such algorithm, one remains in the start waiting state (cycle 401) until it does not occur that for three subsequent measurement times, the motor-vehicle speed is greater than a threshold value equal, for example, to 0.3 m/s. In a greater detail, one has a transition 402 towards the stop waiting state S2 when:

the speed value measured at the i-th time, v(i), is greater than 0.3 m/s; and the speed value measured at the (i+1)-th time, v(i+1), is greater than 0.3 m/s; and the speed value measured at the (i+2)-th time, v(i+2), is greater than 0.3 m/s.

The i-th time is taken as a starting time. One then remains in the stop waiting state S2 (cycle 403) until it does not occur that a speed measured in three subsequent times is lower or equal to the threshold value 0.3 m/s. Then one returns (transition 404) to the start waiting time S1 when following conditions occur:

the speed value measured at the i-th time, v(i2), is lower or equal to 0.3 m/s; and the speed value measured at the (i+1)-th time, v(i+1), is lower or equal to 0.3 m/s; and the speed value measured at the (i+2)-th time, v(i+2), is lower or equal to 0.3 m/s.

The i-th time is taken as a stop time.

After the transition 404 the obtained estimation value is provided to the reporting device 4 of FIG. 1.

In the following an example is described of a further driving style estimation method, which can be used in addition to the estimation method 200, illustrated with reference to FIG. 2, or such further method can be independent from the estimation method 200. This further driving style estimation method can be used, for example, in order to evaluate how the behaviour or the driver is more or less safe mainly with respect to the transported passengers.

Figure 7:
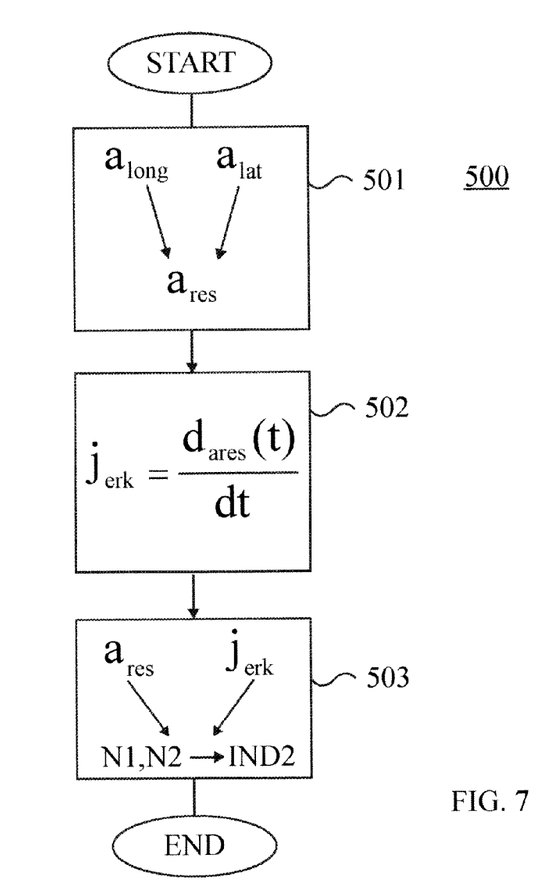
FIG. 7 shows a flow-chart referring to another motor-vehicle driving style estimating method which can be implemented by means of the estimating system described with reference to FIG. 1.

Reference will now be made to FIG. 7, which shows a flow chart 500 of said further driving style estimation method. In a first phase 501 an acceleration signal $a_{res}(t)$ of the motor-vehicle is acquired, representing the amplitude of a resulting acceleration corresponding to the vector sum of the longitudinal acceleration $a_{long}(t)$ and of the lateral acceleration $a_{lat}(t)$. In particular, the resulting acceleration signal $a_{res}(t)$ can be obtained by implementing, for example in the calculation module 10, a software algorithm corresponding to following formula:

$$a_{res}|a|=\sqrt{a_{long}^2+a_{lat}^2} \qquad (6)$$

Regarding the determination of the longitudinal acceleration signal $a_{long}(t)$, it can be obtained directly from the inertial measuring system 5, if available, or it can be determined by deriving the speed signal v(t) of the motor-vehicle. The signal representing the lateral acceleration $a_{lat}(t)$ can be provided by the inertial measuring system 5 or it can be obtained by following formula, which can be for example implemented through a software by the calculation module 10:

$$a_{lat}(t)=\omega(t)v(t) \qquad (7)$$

in which $\omega(t)$ is the angular rotation or yaw rate of the motor-vehicle provided by a suitable sensor of the inertial measuring system 5 and v(t) is the still defined motor-vehicle speed. The speed signal v(t) can be for example that provided by the GPS receiver or by a speed sensor of the inertial measuring system 5 or it can be obtained by the integration of the longitudinal acceleration signal $a_{long}(t)$ provided by the inertial measuring system 5. Alternatively, the speed signal is that obtained through the frequency separation technique described with reference to FIG. 5.

In a second phase 502, on the base of the resulting acceleration $a_{res}(t)$, (for example through the calculation module 10), the characteristic "jerk" is calculated, also known as "jolt", that is the time derivative of the resulting acceleration $a_{res}(t)$ through following formula:

$$jerk(t) = \frac{da_{res}(t)}{dt} \quad (8)$$

In particular, the calculation module 10 can implement the formula (8) in a numerical way. In a third phase 503, another estimation of the driving style is made, for example, by means of the second estimation module 11, which takes into account both the amplitude of the resulting acceleration $a_{res}(t)$ and the jerk(t) expressed in the relation 8. It must be noted that this estimation indicates as non virtuous those driving modes in which the module of the resulting acceleration $a_{res}(t)$ is high and/or the jerk(t) is high.

Figure 8:
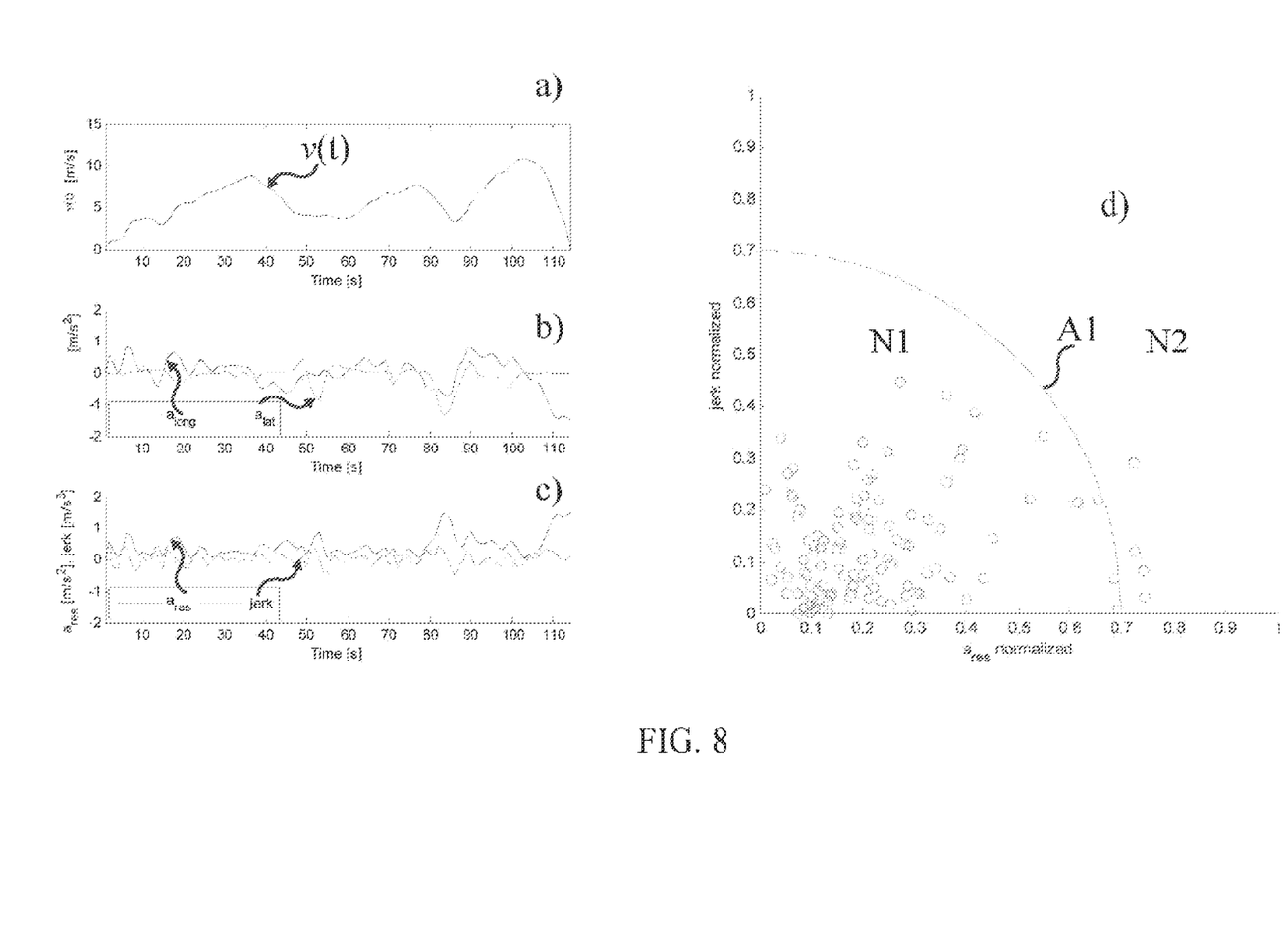
FIGS. 8a, 8b and 8c show curves relating to various kinematic characteristics associated to the movement of the vehicle.
FIG. 8d shows samples of acceleration and jerk values relating to the motor-vehicle, represented on a Cartesian reference system.

FIG. 8 refers to experimentally obtained data. In particular, FIG. 8a shows a speed curve v(t), FIG. 8b shows a curve of longitudinal acceleration $a_{long}(t)$ and one of a lateral acceleration $a_{lat}(t)$ and FIG. 8c shows a curve of resulting acceleration $a_{res}(t)$ and a curve of jerk(t). In FIG. 8d samples are shown measured with one second period corresponding to couples of normalized values of the resulting accelerations and of the jerk. The digital data referring to such samples are stored in the sample memory 7. The normalization has been made, according to this example, by considering the sample most proximate to the origin of the entire experimental test park as the zero of the system of Cartesian axes and that most remote from the origin of the entire experimental test park like the unity.

Furthermore, in the diagram of FIG. 8d an arc A1 is indicated which limits a circular sector including samples corresponding to a driving style considered safe. In fact, the samples inside the arc A1 have as coordinates a resulting acceleration $a_{res}(t)$ and a jerk(t) to which an Euclidean distance from the origin corresponds which is lower than a normalized threshold, in the example 0.7 (that is, smaller than the radius of the arc A1). The samples having an Euclidean distance from the origin greater than the threshold of 0.7 are deemed to correspond to a non safe driving style.

It is also possible to divide the area of the diagram of FIG. 8d in a plurality of rings associated to different safety levels. It must be noted that the threshold of 0.7 in an empirical value, just provided as an example, but of which the plausibility was experimentally evaluated.

The second estimation module 11 can be configured in order to make calculations which permit to compare the Euclidean distance of each point of the plane defined by the diagram of FIG. 8 (having specific values of the coordinates $a_{res}(t)$ and jerk(t) with the aforementioned threshold value. By defining with N the total number of samples, it is possible to calculate a first percentage N1 and a second percentage N2. The first percentage N1 is given by the percentage of samples with respect to the total number N having a distance from the origin lower than the threshold of 0.7. The second percentage N2 is given by the percentage of samples with respect to the total number N having a distance from the origin greater than the threshold of 0.7. These percentages give a second indication IND2 of the estimation of the driving style.

Alternatively, the estimation of the driving style can also be made, for example, not based on a calculation of the distance of each sample from the centre of the system of axes $a_{res}(t)$ and jerk(t) but calculating a centre of gravity of the assembly of the samples and comparing the distance of this centre of gravity with the threshold indicated before. It is also possible to calculate the position of the centre of gravity in a weighted way, that is associating to each sample a different weight depending on the fact that is greater the normalized value of the resulting acceleration or that of the jerk.

Regarding the duration of the measurement path and the times needed for the presentation of the estimation to the driver, this may apply also for this further estimation method with the same considerations made with reference to the method 200 of FIG. 2.

Figure 9:
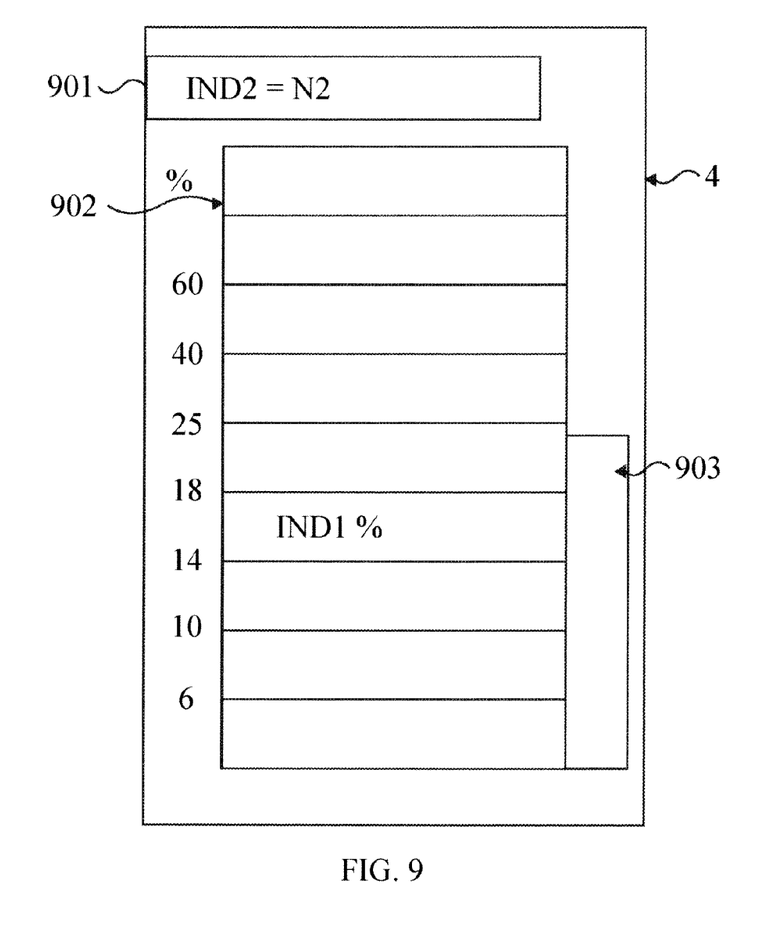
FIG. 9 shows an example of a display visualization on a smartphone of the results of the aforementioned estimating methods.

FIG. 9 shows an example of a possible visualizing mode on a display of a reporting device 4 (as in particular the same display of the smartphone with which the processing unit 2 is made) of the first indication IND1, referring to the energy utilized and of the second indication IND2 referring to the drive safety. According to this example, a horizontal bar 901 has an approximate length of the percentages of non safe behaviours, that is it has an approximate length of the percentage N2 described before which then makes, according to this example, the second indicator IND2.

On a scale 902 the first indication IND1=(E1−E2)/E2 100 is also shown, representing the portion of energy E1 expended by the engine which exceeds the reference energy E2. The first indication IND1 is also representing the fuel consumption exceeding that which would occur, if the driving would be made with more virtuous modes.

Advantageously, another bar 903 can be provided, for example a vertical one, having a length representing a mobile average which takes into account the behaviour of the driver with respect to the consumptions as estimated on a plurality of measuring time frames, comprised between a start and a stop. So the driver, observing his own smartphone 4, will be able to rapidly know the driving style which is adopting, in order to be able to improve it by behaving more carefully in order to reduce the consumption and improve the safety of any passengers of transported items.

The Applicant has made experimental measurements by estimating the behaviour of various drivers on the same path and in comparable traffic conditions, and he was able to observe how both described methods permit to identify the different driving styles associated to different drivers.

With reference to the estimation method 200 of FIG. 2, it must be noted that the choice of utilizing for the comparison on which the estimation is based, a reference characteristic obtained by a low-pass filtration of a measured characteristic makes particularly realistic the estimation made, for the reason that one avoids to consider non virtuous such behaviours of the driver which where unavoidable having been caused, for example, by the traffic, the traffic lights or others.

The Applicant has perceived and applied the fact that this approach looks much better than an approach according to which the estimation was based on the comparison between a kinematic characteristic measured with an "optimum" performance predefined of the same kinematic characteristic, just obtained on the base of the model of the motor-vehicle and on a general analysis made a priori of the path covered by the motor-vehicle.

As previously said, the results of the estimation can also be made available by a monitoring station in which further calculations and statistics could be performed, by creating reports in relation to the behaviour of the drivers.

It must be noted that even if in the description given above often reference was made to the context of passenger transportation busses, the described teachings are also applicable to other surface vehicles (like for example taxis, hire cars or trucks), or to sea vehicles (for example, motor ships or hydrofoils) or to airplanes (for example, planes or helicopters) for the transport of passengers and/or products.

The invention claimed is:

1. A motor-vehicle driving style estimating system comprising:
    a measuring apparatus of a kinematic signal representative of a motor-vehicle motion quantity trend (v(t)) along a measurement path;
    a low-pass filtering module configured to filter the kinematic signal and provide a corresponding reference filtered signal associated with a reference trend of said quantity (vF(t));
    a processing module comprising a computing module configured to:
        compute from the kinematic signal and a motor-vehicle description model an estimation of an energy used by the motor-vehicle (E1) along the measurement path, and
        compute from the reference signal and said motor-vehicle description model a reference energy (E2) associated with the reference trend; and
    a first estimating module configured to compare said energy to the reference energy and provide an indication (IND1) about the driving style depending on an offset between the energy and the reference energy.

2. The estimating system according to claim 1, wherein said measuring apparatus is constructed so that such quantity is a speed and the kinematic signal is a speed signal representative of a motor-vehicle speed trend; the filtering module being configured so that said filtered signal is a reference speed signal.

3. The system according to claim 2, wherein the measuring apparatus comprises:
    a measuring device configured to provide a first motor-vehicle speed signal; and
    an accelerometer configured to provide a longitudinal motor-vehicle acceleration signal,
    wherein the processing module comprises a frequency-separation pre-treatment module configured to:
    low-pass filter (HPF1) the first speed signal,
    high-pass filter (HPF2) the longitudinal acceleration signal,
    integrate (INT) the longitudinal acceleration signal resulting from the high-pass filtering to obtain a second speed signal, and
    combine the first speed signal, the second speed signal, and the first speed signal as resulting from filtering in order to obtain said speed signal representative of the motor-vehicle speed trend.

4. The system according to claim 1, wherein said measuring apparatus and said filtering module are such that the kinematic signal and the reference signal are digital signals and wherein the computing module is configured to:
    estimate a power supplied by a motor of the motor-vehicle based on the kinematic signal and said motor-vehicle model and calculate said energy from said power; and
    estimate a reference power associated with said reference trend and said motor-vehicle model and calculate said reference energy from the reference power.

5. The system according to claim 1, wherein said indication about the driving style is provided at the end of a time slot associated with said measurement path and comprised between a start moment and a stop moment of the motor-vehicle.

6. The system according to claim 5, further comprising an automatic evaluation module for automatically evaluating stop and start moments of the motor-vehicle, which operates according to the signals received from the measuring apparatus.

7. The system according to claim 1, wherein said measuring apparatus is configured to acquire an acceleration signal representative of said motor-vehicle acceleration, and wherein said processing module further comprises:
    an acceleration signal derivation module configured to return a jerk signal representative of the time variation in said acceleration signal;
    a storing module configured to store a plurality of samples each indicative of an acceleration value and of a corresponding jerk value; and
    a second estimating module configured to compare pairs of acceleration and jerk values to reference values and provide a further indication of the motor-vehicle driving style related to the driving safety of the motor-vehicle.

8. The system according to claim 7, wherein said acceleration is an amplitude of a resulting acceleration (ares) of a vectorial sum of a motor-vehicle longitudinal acceleration and a motor-vehicle lateral acceleration.

9. The system according to claim 1, wherein said measuring apparatus comprises at least one of the following devices: a GPS receiver, a speed sensor, an acceleration sensor, and an inertial measurement system.

10. The system according to claim 1, wherein the measuring apparatus is constructed as to send measurement signals to said filtering module and to said processing module according to a wireless mode.

11. The system according to claim 1, comprising a display apparatus configured to make at least one of said first indication of the driving style and said second indication of the driving style, available to a motor-vehicle driver.

12. A method for estimating the driving style of a motor-vehicle, comprising:
    generating from measurements a kinematic signal representative of a motor-vehicle motion quantity trend (v(t)) along a measurement path;
    low-pass filtering the kinematic signal obtaining a corresponding reference filtered signal associated with a reference trend of said motor-vehicle motion quantity (vF(t));
    computing from the kinematic signal and a motor-vehicle description model an estimation of an energy (E1) used by the motor-vehicle along the measurement path;
    computing from the reference filtered signal and said motor-vehicle description model a reference energy (E2) associated with the reference trend;
    comparing said energy to the reference energy; and
    providing an indication (IND1) about the driving style depending on an offset between the energy and the reference energy.

* * * * *